United States Patent [19]

Notermann

[11] Patent Number: 4,869,545
[45] Date of Patent: Sep. 26, 1989

[54] RECREATIONAL VEHICLE HAVING ACCESSORY VEHICLE CARRYING AND UNLOADING ABILITY

[76] Inventor: Alan C. Notermann, 7127 Highway 10, Anoka, Minn. 55303

[21] Appl. No.: 243,495

[22] Filed: Sep. 12, 1988

[51] Int. Cl.[4] .................................................. B60P 3/32
[52] U.S. Cl. ....................................................... 296/157
[58] Field of Search ...................... 296/157; 280/414.1

[56] References Cited

U.S. PATENT DOCUMENTS

| | | | |
|---|---|---|---|
| 2,543,349 | 2/1951 | Britton | 296/157 |
| 2,847,136 | 8/1958 | Neff | 296/157 |
| 3,116,949 | 1/1964 | Muse | 296/157 |
| 3,179,462 | 4/1965 | Hagen | 296/157 |
| 3,193,321 | 7/1965 | Rose | 296/157 |
| 3,448,875 | 6/1969 | Robinson, Jr. | 296/157 |
| 3,784,248 | 1/1974 | Neuman | 296/157 |

OTHER PUBLICATIONS

"Trailer Life", Magazine, Nov., 1987, p. 97.
"National Enquirer", Magazine Aug. 20th, 1988, p. 2.

*Primary Examiner*—Robert R. Song
*Attorney, Agent, or Firm*—Sten E. Hakanson

[57] ABSTRACT

The invention herein concerns a recreational vehicle having the ability to carry an accessory vehicle three within and unload the accessory vehicle thereform. In the preferred embodiment thereof, the invention herein includes an exterior housing having top and bottom surfaces, sidewalls and front and back ends defining an interior living space. The housing is secured to a base frame lying there below. The base frame includes an accessory vehicle portion. A movable floor portion extends horizontally and above the trailer portion and can be moved in a vertical direction to a top accessory vehicle receiving position and a bottom living area position. An access door is hingedly attached to the rear housing surface. The access door allows for loading the accessory vehicle into the living area onto the trailer portion when the floor portion is in the top position and the trailer portion is fully uncovered. The access door also allows for unloading of the accessory vehicle from the trailer portion. When unloaded, the floor portion is operated to the bottom position so that the interior of the present invention can be fully utilized for living space.

19 Claims, 4 Drawing Sheets

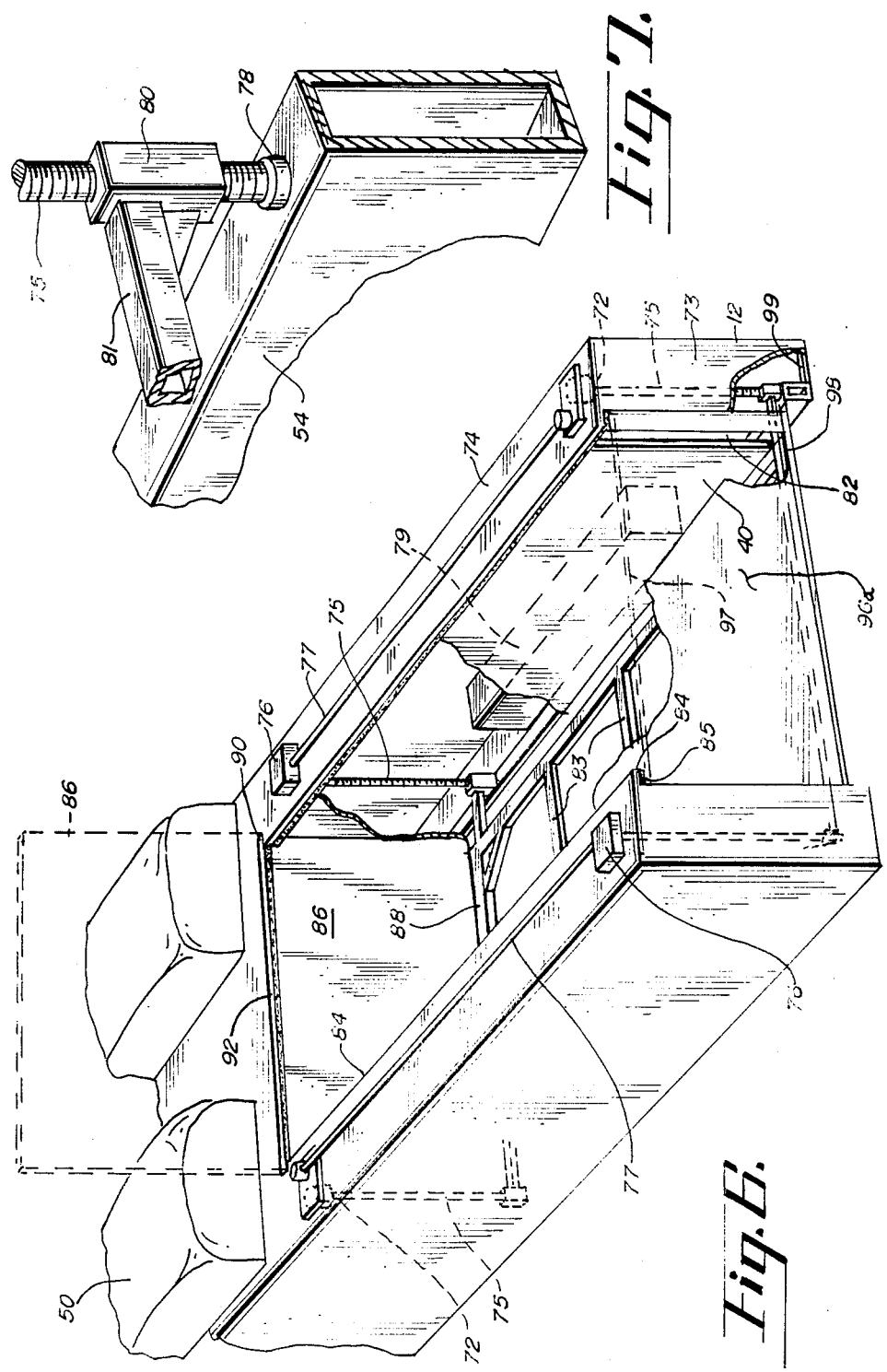

RECREATIONAL VEHICLE HAVING ACCESSORY VEHICLE CARRYING AND UNLOADING ABILITY

BACKGROUND OF THE INVENTION

1. Field of the Invention.

This invention relates generally to recreational vehicles, and more specifically to recreational vehicle having the ability to provide for the carrying of an accessory vehicle there within, and for unloading the accessory vehicle therefrom.

2. Description of the Prior Art

Recreational vehicles such as motor homes and trailer homes of the type used for vacation and leisure use are well known in the art. This portable housing has developed to such a point that modern recreational vehicles can, and are even expected, to offer virtually all the comforts of home. In addition, many recreational vehicle users have the need or desire to take with them a boat or other such accessory vehicle, such as a small car. However, the multiple trailering behind a towing vehicle of trailer home and an accessory vehicle is dangerous, and is illegal in most jurisdictions. Even for a self-propelled motor home, it is not always an ideal situation, due to convenience and overall length considerations to tow an accessory vehicle there behind. Thus, attempts have been made to allow for the carrying of a boat or other accessory vehicle on or within a recreational vehicle. Transportation on the top or back of a recreational vehicle is only suitable for objects that can be manually lifted or otherwise handled, such as a small row-boat or motorcycle. The interior of the recreational vehicle potentially offers greater capacity, as they are now commonly in excess of 20 feet. However, a major difficulty has been to create a recreational vehicle that can carry a large object, such as a boat, there within, and do so in a way that permits maximal devotion of the interior volume thereof to that task, yet does not unduly restrict the manner in which the interior of the trailer or motor home can be designed to provide for, or utilized as living space. Another problem concerns the need to provide for a convenient and easy means for loading the accessory vehicle into the recreational vehicle and for unloading it therefrom. Specifically, in the case of a boat, there is needed a convenient means for launching the boat from the recreational vehicle directly into the desired body of water, and for loading the boat therein directly from the body of water.

Various trailers having boat carrying capacity have been proposed. See for example, U.S. Pat. No. 2,847,136 to Neff, and U.S. Pat. No. 3,193,321 to Rose. However, the trailers seen therein impose height restrictions on the placement of the interior amenities, such as cabinets, stove, sink and so forth. Also, these trailers do not allow for launching of the boat into a lake or other, body of water, directly therefrom. In particular, these trailers call for the use of rolling support means to first provide for the removal of the boat therefrom. The boat must then be released from the support means prior to its actual launching. Such a launching process is cumbersome and only suitable for smaller watercraft that can be manually placed into the water after removal of the support means.

Other campers have been proposed that include a boat trailer that forms an integral yet separable part of the bottom frame thereof. See for example U.S. Pat. No. 3,116,949 to Muse, and U.S. Pat. No. 3,784,248 to Neuman. In these trailers, after finding a suitable location, the upper shell of the camper is detached from the boat trailer and support means are then extended to hold the camper above the ground. The towing vehicle then pulls the trailer with the boat thereon free of the camper shell. Foldable panels are then extended to provide for a floor in the camper. Such a launching process is time consuming as compared to direct launching of a boat from a conventional boat trailer, and requires trailer and frame interlocking mechanisms. The Muse and Neuman references describe the use of furniture such as beds, tables and benches that are attached to the walls of the camper and that can be swung down after the removal of the boat. This technique is used to minimize the amount of interior space devoted to such furniture, and thus, to increase the amount of interior space available for a boat. However, this type of furniture can be rather insubstantial and uncomfortable, is quite limiting as to the possible arrangements of the interior of the trailer, and can result in a camper interior that is sparse and unappealing.

It would therefore be desirable to have a recreational vehicle that can carry an accessory vehicle, that provides for quick and easy loading and unloading of the accessory vehicle, and that permits flexible and desirable use of the interior thereof.

SUMMARY OF THE INVENTION

The objects and advantages of the present invention include, but are not limited to, the following:

1. To provide for a recreational vehicle that can carry an accessory vehicle there within, without placing undue restraints on the manner in which the interior thereof can be designed to allow for desirable and useable living space.
2. To provide for such a recreational vehicle that permits loading and unloading of an accessory vehicle therefrom.
3. To provide for such a recreational vehicle that, in particular, provides for loading and launching of a boat directly there from into and out of a body of water.
4. To provide for such a recreational vehicle that is easy and convenient to use.

The present invention specifically concerns a modified mobile or trailer home. As with conventional trailers, the invention herein includes an outer shell or housing structure having top, side and end walls secured to a base frame structure. The base frame includes wheel and axle means to provide for mobility of the trailer, and includes a hitch at the front end thereof for providing releasable attachment to a towing vehicle.

The interior of the trailer can be viewed as being divided into front, middle and rear sections having a front fixed floor area, a middle elevatable floor portion, and a rear loft area. The front floor area is secured to the base frame in the conventional manner. The front section is devoted primarily to the kitchen and lavatory related trailer amenities such as a sink, refrigerator, cabinets, shower and toilet.

The floor portion of the middle section is separate from the floor portion of the front section and includes a middle floor support frame. The middle floor portion is operable upwardly and downwardly relative to the base frame of the trailer. Mechanical means for raising and lowering the middle floor portion are secured to the base frame at the perimeter of the middle section and to the support frame thereof. Thus, the middle section is operable downwardly to rest upon the portion of the base frame extending there under. Also, in this down position, the middle floor portion is level with the front floor portion and forms a common seam or edge therewith, and common edges with that portion of each of the sidewalls of the trailer extending along the middle section thereof. Various pieces of furniture, and the like, are secured to the top surface of the middle floor portion.

The rear section includes a loft platform fixedly secured above the base of the trailer to the end wall of the trailer and to each portion of the sidewall thereof extending along the platform. The platform is held in a position approximately midway between the base frame and top or ceiling of the trailer. A closure wall is secured to and along the rear edge of the middle floor portion and extends upwardly therefrom approximately to the level of the loft platform. The closure wall is used to close over and cover the opening that exists between the middle floor portion when it is in the down position and resting upon the base frame, and the level of the loft. The middle floor portion is elevatable upwardly to a level equal to that of the loft portion, whereupon the closure wall extends upwardly into the ceiling space there above. With the middle portion in the up position, a boat winch is revealed that is secured to the base frame below the front floor portion and centrally thereof, and adjacent the common seam that runs between the middle and front floor portions.

That portion of the base frame existing ostensibly below the middle floor and end loft portions consists primarily of a rigid boat trailer frame forming an integral and structural part thereof. The boat frame portion includes various steel members having a plurality of boat support means attached thereto designed to retain and cradle a boat. The rear end wall of the present invention includes a hinged access door opening into the trailer below the loft floor portion. The access door provides for loading of a boat into the trailer and onto the boat trailer therein, and launching of the boat therefrom into a body of water.

The ability of the present invention to trailer a boat can be understood, wherein the middle floor portion is first elevated upwardly substantially level with the loft portion after which the rear access door is opened. As a result thereof, the furniture and other interior amenities attached to the middle floor are lifted above the that part of the boat trailer portion lying there below, so that a boat can be placed thereon through the access door. The boat is typically loaded onto the trailer from a body of water wherein the trailer is backed slightly therein, and a cable from the winch is attached to the boat for pulling the boat onto the boat trailer. After the boat is loaded into position the access door is closed and the present invention can then be driven or trailed away with the boat safely held therein. Launching of the boat is accomplished essentially in a manner reverse to that of loading, wherein the access door is opened and the present invention is backed sufficiently into a body of water to allow the boat to be released therefrom. After launching of the boat and closing of the access door, the middle floor portion is lowered to its bottom position resting upon the boat trailer portion of the base frame. The closure door is then swung into essentially a vertical position to close off from the interior living area that space that exists below the loft platform. The present invention can then be placed at a suitable location for providing spacious and comfortable housing.

It can be appreciated that the present invention provides for loading and launching of a boat in the conventional manner directly into or out of a body of water without the need for other mechanical contrivances or other intermediate steps. Thus, the present invention can allow for the use of a boat of a generally larger size than is seen possible with prior art recreational vehicles. Moreover, it can be understood that the elevatable middle floor section lifts the furniture and the like secured thereto up and above the space within the trailer that is occupied by the boat when loaded onto the trailer. This approach permits a much greater flexibility of interior design or arrangement than is seen in the prior art, wherein the furniture and so forth are limited to narrow perimeter wall arrangements, or which prior art trailer designs dictate the use of less desirable collapsible or foldable furniture.

BRIEF DESCRIPTION OF THE DRAWINGS

Further objects and advantages of the present invention can be had in view of the following detailed description which refers to the following figures, wherein:

FIG. 6 shows an interior perspective view of the present invention with the middle floor section in the up position.

FIG. 7 shows an enlarged detailed view along lines 7—7 of FIG. 6.

DETAILED DESCRIPTION OF THE PREFERRED EMBODIMENTS

Figure 5:
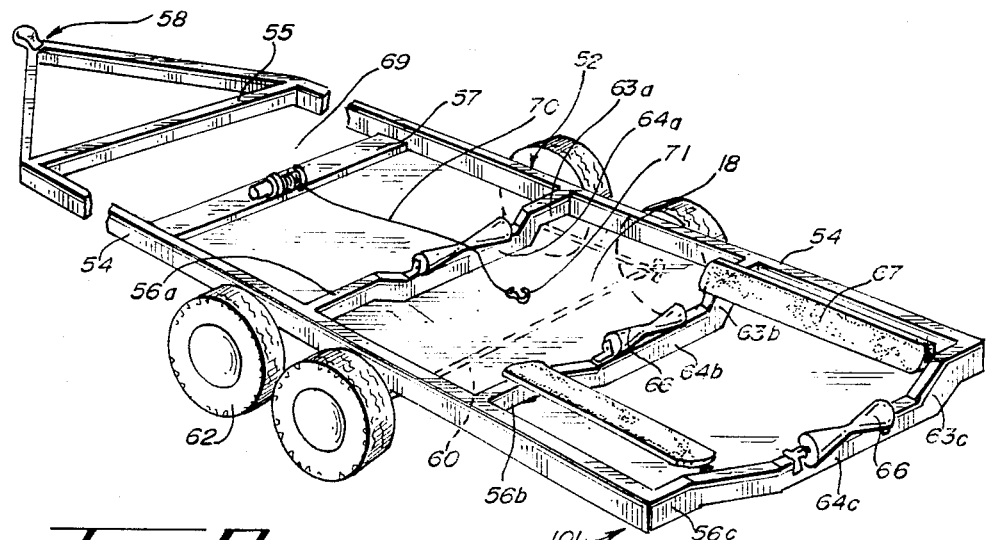
FIG. 5 shows a perspective view of the base frame and integral boat trailer portion thereof.
Figure 1:
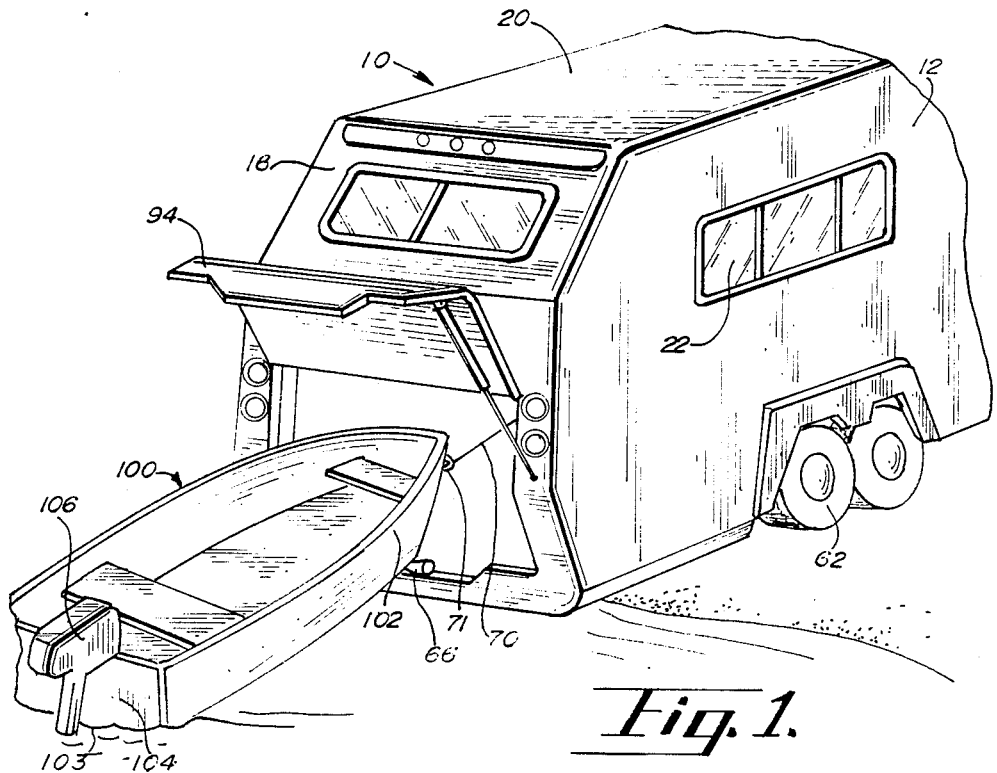
FIG. 1 shows an environmental view of the present invention.

The recreational vehicle of the present invention is represented as a trailer in the various Figures and is generally referred to by numeral 10. Unless otherwise stated, trailer 10 is of conventional construction, as is known in the art, and includes, as seen in the various figures, an exterior housing having sidewalls 12, a front end wall 14, a rear end wall 16, a bottom surface 18 and a top surface 20. Trailer 10 also includes windows 22, and a door 24 for providing access into the interior living space thereof. As seen in FIG.'s 3 and 4, the interior of trailer 10 is arranged into three essentially equally sized sections, a front kitchen/bath area 26, a middle living area 28 and a rear loft sleeping area 30.

Figure 3:
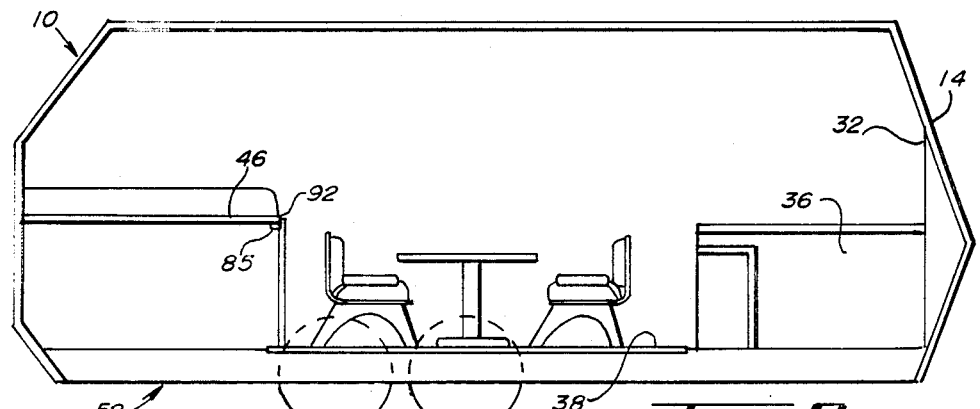
FIG. 3 shows a side plane cross sectional view of the present invention with the middle floor section in the down position.

Kitchen/bath section 26 includes a front floor portion 31 and interior walls 32. Section 26 also includes various amenities such as a sink 33, bath 34, counter tops 35 and storage cabinets 36, secured to floor portion 31 and walls 32. Middle area 28 includes middle floor portion 38, and middle interior walls 40. Living area 28 further includes various pieces of furniture secured to floor portions 38, such as, couch 41, chairs 42, and table 43. Loft area 30 includes a flat loft platform 46 extending horizontally and secured along three sides of its perimeter to sidewalls 48 and end wall 49 of loft area 30. As seen in FIG. 3, platform 46 is secured to walls 48 and 49 at a level above that of middle and front floor portions 31 and 38. A mattress or cushion 50 can be placed upon platform 46, for providing for a sleeping area.

Referring to FIG. 5, trailer 10 includes a base frame 52, having side rails 54 connected by a plurality of rigid strengthening cross members including front members 55, boat support members 56a, 56b, and 56c, and a flat horizontally extending winch support member 57. Frame 52 further includes a hitch means 58 integral with side rails 54 to allow for releasable attachment of trailer 10 to a towing vehicle. Frame 52 provides a foundational base for trailer 10 to which the housing structure thereof is secured, and to which an axle 60, and suspension means, not shown, are attached for providing towing of trailer 10 on wheels 62.

Support members 56a-c do not extend between side rails in a plane common with front members 55, but rather include downwardly angled sections 63a, 63b and 63c, and mid-sections 64a, 64b and 64c. Mid-sections 64a-c exist in a plane below that of members 55, and specifically, are held at progressively lower levels with respect thereto in a direction from support member 56a to 56c. Keel rollers 66 are secured to center sections 64a-c, and a pair of boat support bunks 67 are secured to members 56. Bunks 67 are rectangular in shape and extend essentially perpendicularly to members 56 adjacent side rails 54. A winch 69 is secured to cross members 57 and is supported thereby below the level of front floor portion 31. Winch 69 includes a cable 70 and hook 71, and is connected to a switchable source of electrical power for the controlled operation thereof.

Figure 2:
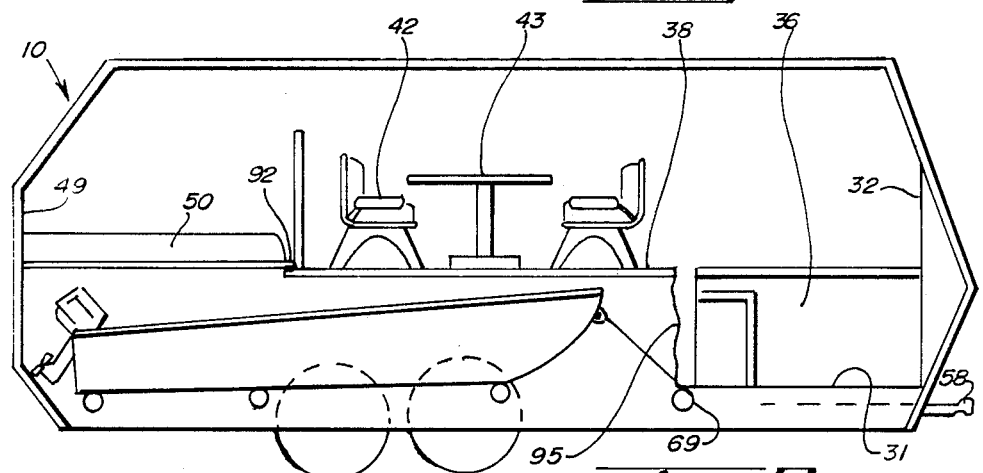
FIG. 2 shows a side plan cross sectional view of the present invention with the middle floor section in the up position.
Figure 4:
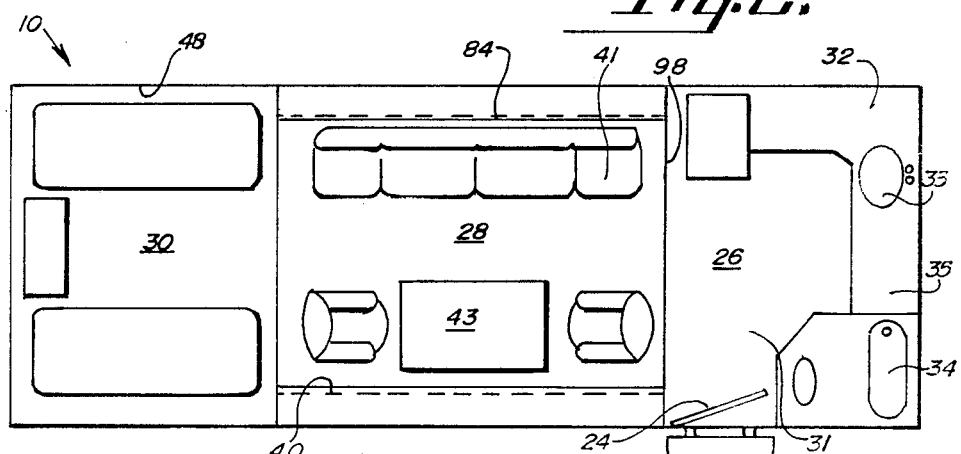
FIG. 4 shows a top plan view of the present invention showing the interior floor plan arrangement thereof.

Middle floor portion 38 is separate from front floor portion 31 and rear area 30, and can be operated upwardly and downwardly to a top position, as seen in FIG. 2, and in dashed outline in FIG. 6, and to a bottom position as seen in FIG.'s 3 and 6. Referring to FIG. 6, means for raising floor portion 38 in the present embodiment include electrically operated motors 72 secured within interior spaces 73 that exist between exterior housing walls 12 and interior walls 40. Motors 72 are secured diagonally of each other to framing boards 74 of walls 40 at a level thereon slightly above that of platform 46, and vertically of the corners of floor portion 38. Motors 72 are connected to threaded screws jacks 75 that depend downwardly therefrom. A pair of right angle gear drives 76 are positioned in the same manner as motors 72 on the common wall therewith. Gear drives 76 are rotatively connected to motors 72 by horizontally extending connecting shafts 77. Gear drives 76 are, like motors 72, are also rotatively connected to screw jacks 75 extending downwardly there from. As seen in greater detail in FIG. 7, jacks 75 include pivot supports rotatively secured on the ends thereof opposite to motors 72 and gear drives 76. Pivots 78 are secured to side rails 54 and provide for rotational support of jacks 75. Jacks 75 extend through threaded frame blocks 80 in threaded engagement there with. Wall spaces 73 are primarily a result of the width of wheel wells 79 that extend between exterior sidewalls 12 and interior walls 40. Blocks 80 are integral with extensions 81 that extend therefrom in a horizontal plane through vertical slits 82 in walls 40. Extensions 81 are in turn integral with middle floor support frame structure 83. Frame 83 consists primarily of a plurality of box channel cross bracing, to which floor portion 38 is securely attached. Shoulders 84 are secured to walls 40 and extend horizontally there along at a level thereon equal to that of platform 46. Shoulders 84 extend slightly outwardly from walls 40 and include resilient seals 85 attached on the underside thereof. A free standing closure wall 86 is secured adjacent the back edge 88 of middle floor section 38 and extends upwardly therefrom to a height even with loft platform 46. Notches 90 in shoulders 84 permit wall 86 to extend substantially the full width of living area 28 to walls 40. The front edge 92 of platform 46 also has a resilient seal 85 attached to the bottom side thereof. An access door 94 is hingedly secured to rear end wall 16 at a level equal to platform 46. As seen in FIG. 2, when floor portion 38 is in the full up position, a curtain or tarp 95 is secured to the end opening of area 96, the perimeter of which is defined by the front edge 97 of floor portion 38, interior walls 40 and the rear edge 98 of front floor portion 31. Various releasable attachment means, not shown, such as Velcro (®) can be used around the perimeter of curtain 95 to provide for attachment thereof to the perimeter of area 96. As is known in the art, a plurality of housing support brackets 99 are integral with side rails 54 and extend outwardly therefrom to provide for support of the trailer housing.

The manner in which the present invention can be operated to carry a boat 100 can now be understood. Floor portion 38 is first moved to the full up boat receiving position, as seen in FIGS. 2 and 6. Specifically, floor portion 38 is moved by action of motors 72 rotating jacks 75, directly, and indirectly through rotation of connecting shafts 77 and right angle gear drives 76, whereby the rotation thereof in threaded blocks 80 results in the movement of frame 83, and therefore, floor portion 38. As a result of such positioning, the furniture attached to floor portion 38 is lifted into the ceiling space there above, thereby creating space within trailer 10 for holding boat 100. Also, it can be readily understood that the upward positioning of floor portion 38 fully uncovers an integral boat trailer portion 101 of base frame 52 which portion includes cross members 56a-c, keel rollers 66, and support bunks 67. Thus, boat trailer portion 101 is then ready to accept a boat. Moreover, winch 69 is revealed beneath front floor portion 31 and can then be accessed for attachment to the boat being loaded. Boat loading is typically accomplished by backing tailer 10 adjacent a body of water in which the boat is located and then opening access door 94. Boat motor 106 is generally first tilted upwardly and rotated slightly into a storage position which serves to reduce its overall vertical height and provide for protection of the prop thereof. Winch cable 70 is then attached to the bow 102 of boat 100 by cable hook 71, after which winch 69 is operated to pull boat 100 onto boat trailer portion 101. Thus, as is known in the art, boat 100 will be loaded onto trailer portion 101 by movement of the keel 103 thereof on keel rollers 66. When boat 100 is in the fully loaded position, as is seen in FIG. 2, bunks 67 provide for securing against lateral motion of boat 100 during transport thereof. Access door 94 is then closed and boat 100 can be towed to another location. It can be understood that in the full up position the perimeter edges of floor portion 38 are pressed against seals 85, which, along with curtain 95, serve to substantially limit any air communication between that portion of the interior space of the trailer in which boat 100 is held and the balance of the interior of trailer 10. Thus, any residual gas fumes, and the like, from boat 100 can be prevented from entering the remainder of the interior of trailer 10.

It can also be appreciated that launching of boat 100 from trailer 10 is essentially the reverse of the above detailed loading process. In particular, trailer 10 is backed adjacent a body of water, after which access door 94 is opened. Bunks 67 are then lowered and winch 69 is operated to allow boat 100 to slide along rollers 66 into the body of water. As seen in FIG. 2, the progressive lowering of center sections 64a–c of cross members 56a–c, results in boat 100 residing at an angle within trailer 10, wherein bow 102 of boat 100 is higher than the stern 104 thereof. This progressive increase in the cradling of boat 100 allows the force of gravity to enhance the launching of boat 100 from trailer portion 101, whereby boat 100 is held in an inclined position that slopes downwardly in the direction of the launching of boat 100 towards the body of water. This increasing depth of members 56a–c, in the direction towards the rear of trailer 10, also serves to allow for more clearance height underneath platform 46 to assure adequate room in a vertical plane for boat motor 106, or to allow for a boat having greater height in a vertical direction in the stern area thereof. In addition, stern 104 is held more closely to the level of the body of water so that the body of water will provide for flotational support of the boat earlier in the launch process. Such weight support helps to facilitate launching of the boat, and reduces the distance that the end of trailer 10 must be backed over the body of water to allow for the launching of the boat. Specifically, middle section 64c, as with the analogous middle point of the end member of standard boat trailers, is preferably at a height of approximately 12 to 18 inches above ground level to provide for a smooth and direction launching of the watercraft. Once boat 100 is launched, cable 70 is rewound onto winch 69, access door 94 is closed and trailer 10 is taken to a suitable camping location. Curtain 95, secured to the perimeter of area 96, can then be removed and floor portion 38 lowered to the full down position seen in FIG.'S 3 and 6. Trailer 10 is then immediately ready to be fully utilized as living space, as the furniture and the like attached to floor portion is in position to be used, and closure wall 86 provides for sealing off of the, now empty, remainder of the boat storage area below loft platform 46.

Figure 8:
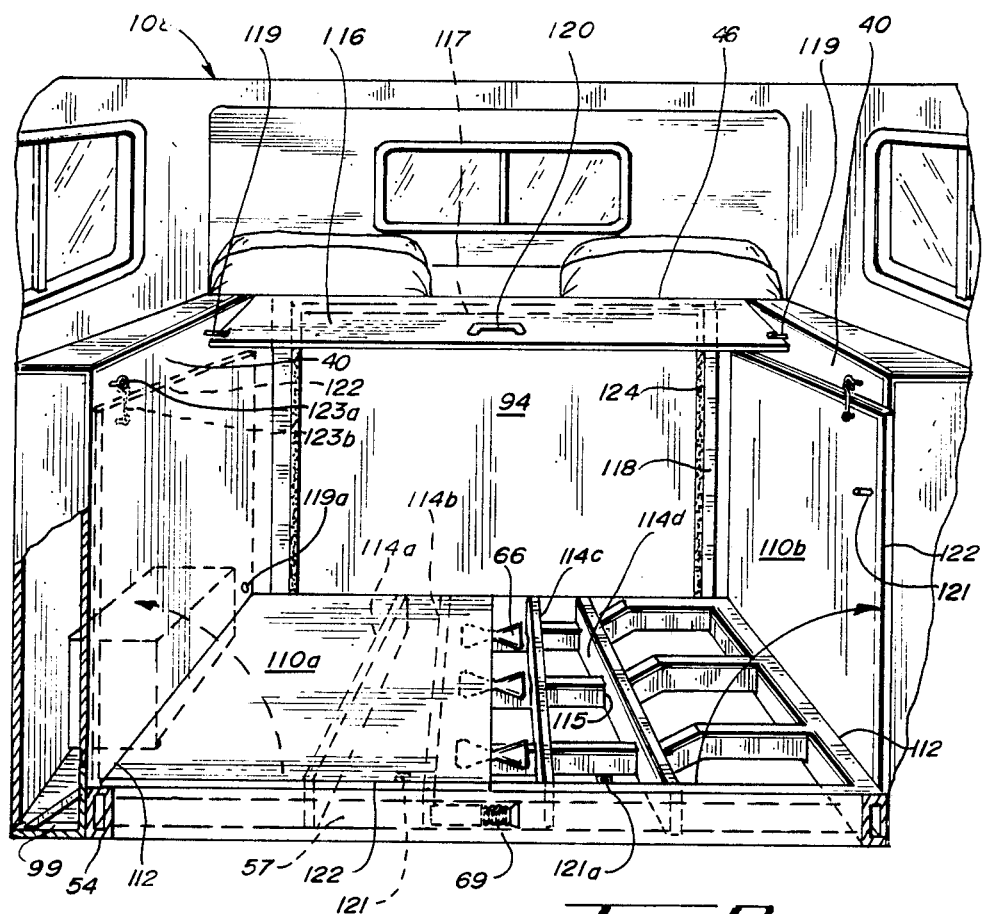
FIG. 8 shows an interior perspective view of an alternative embodiment of the present invention with half of the middle floor section in the up position and half of the middle floor section in the down position.

A second embodiment of the present invention showing an alternate movable floor portion structure is seen in FIG. 8, and referred to generally by the number 108. In this embodiment the middle floor portion consists of two middle door portions 110a and 110b. Doors 110a and 110b are hingedly attached along and adjacent to the bottom edges 112 of interior walls 40 and are secured to frame side rails 54. Four separate floor support units 114a–d are formed to rest upon base frame 52 and specifically to lie transversely to and upon cross members 56a–56c and winch support member 57. Floorboard supports 114a–d include notches 115 therein to cooperate with members 56a–c and 57 to form a flat and level support framework for doors 110a and 110b. A closure door 116 is hingedly secured along and to the front edge 117 of loft platform 46, and depends downwardly therefrom. Door 116 spans the height differential between platform and base frame 52, and is secured against door framing pieces 118 extending along and beneath edge 117, and vertically along walls 40 beneath loft 46. Door 116 includes latch means, such as spring biased sliding pins 119 for securing thereof against frame pieces 118 by insertion into holes 119a, and a handle 120 for facilitating its opening and closing. Securing means, such as bolts 121 extend through doors 110a and 110b adjacent the mutual middle edges 122 thereof and provide for releasable threadable securing to threaded brackets 121a integral with cross member 56a. Releasable door securing means, such as eyelet 123a and hook 123b are attached to walls 40, and doors 110a and 110b respectively.

Referring to FIG. 8, it can be understood that doors 110a and 110b are swingable downwardly to rest upon floor supports 114a–d to form a middle floor portion. Bolts 122, secure doors 110a and 110b to cross member 56a to allow for a more middle portion flooring area. In this down position with doors 110a and 110b resting upon supports 114a–d, closure door 116 is in a vertical position and is closed against door framing pieces 118 and held there by pins 119. Seals 124 on framing pieces 118 allow for tight sealing engagement of door 116 there against. Thus, it can now be understood that, in this down position of doors 110a, 110b, and 116, trailer 108 can provide for living space over the middle floor portion. Unlike embodiment 10, it is contemplated that various forms of moveable or foldable furniture could be used on this middle portion.

Preparing trailer 108 to be in a boat receiving condition involves, first opening closure door 116 and then opening doors 110a and 110b to the positions as indicated by the dashed lines of door 110a and the solid lines of doors 110b and 116, seen in FIG. 8. Specifically, door 116 extends substantially in a horizontal plane and rests upon doors 110a and 110b now extending uprightly in a vertical direction. Doors 110 are held in this full up or open position by eyelet and hook 123a and 123b. Support members 114a–d are then lifted from frame 52 and stored, as for example, on top of loft 46. It can be understood that boat trailer portion 101 is then fully uncovered and a boat can be loaded thereon or launched therefrom in the manner as previously described with embodiment 10 after opening of access door 94.

It can now be fully appreciated that the present invention provides for portable living space that can also easily and conveniently allow for the trailering of an accessory vehicle, such as a boat. Specifically, the present invention includes a convertible middle section that permits the creation of space there within to hold such an accessory vehicle, and to allow access to a vehicle trailering portion that is an integral part of the frame thereof. Moreover, the present invention provides for direct launching therefrom and loading therein of such an accessary vehicle. It will be appreciated by those of skill, that variations of the present invention can be made that will remain within the scope and intent thereof. For example, loft platform 46 could be made movable as with floor portion 38, and a wide variety of boat trailer means having different configurations of the parts thereof could be utilized. Also, the disclosed embodiments of the present invention are modified trailers, however the invention herein could also have been disclosed and described as a motor home or other such recreational vehicle. In addition, the disclosed embodiments show the specific capacity to carry and launch a boat. However, it will be apparent to those of skill that the present invention is not limited to the carrying of boats, and is readily adaptable to carry a wide variety of accessory vehicles, such as a small car. To carry a car it can be understood that, suitable ramps, not shown, could be secured to the base frame and cross members thereof so that the vehicle could be driven thereon and into the recreational vehicle of the present invention.

What is claimed is:

1. A recreational vehicle having an accessory vehicle carrying and unloading ability, comprising: an exterior housing having top and bottom surfaces, a pair of sidewalls, and back end and front end surfaces defining an interior living space thereof, and a base frame underlying the housing and providing support therefor, and the frame having an accessory vehicle trailering portion integral therewith, the trailering portion having a first end and a second end, the second end terminating adjacent the back end surface of the housing, and the trailering portion having a plurality of cross members, and a movable floor portion, the movable floor portion movable to a first accessory vehicle receiving position and to a second living space position, and a rear access door hingedly secured to the back housing surface for providing access into the interior living space of the housing so that the accessory vehicle can be loaded there through onto the trailering portion and launched there through from the trailering portion.

2. The recreational vehicle as described in claim 1, and the middle floor portion extending horizontally and elevatable vertically between a top accessory vehicle receiving position and a bottom living area position.

3. The recreational vehicle as defined in claim 2, and further including motor means operatively connected to the movable floor portion to provide for raising and lowering thereof.

4. The recreational vehicle as described in claim 1, and the movable floor portion including a pair of door portions each hingedly secured along and adjacent the common edges of the sidewalls and the base frame and swingable downwardly to a living area position and upwardly to an accessory vehicle receiving position.

5. A recreational vehicle having a boat carrying and launching ability, comprising: An exterior housing having top and bottom surfaces, a pair of sidewalls, and back end and front end surfaces defining an interior living space thereof, and a base frame underlying the housing and providing support therefor, and the frame having a boat trailering portion integral therewith, the boat trailering portion having a first end and a second end, the second end terminating adjacent the back end surface of the housing, and the boat trailering portion having a plurality of cross members, and a movable floor portion, the movable floor portion movable to a first boat receiving position and to a second living space position, and a rear access door hingedly secured to the back housing surface for providing access into the interior living space of the housing so that the boat can be loaded there through onto the trailer portion and launched there through from the trailering portion.

6. The recreational vehicle as described in claim 5, and the movable floor portion extending horizontally and elevatable vertically between a top boat receiving position and a bottom living area position.

7. The recreational vehicle as defined in claim 6, and further including motor means operatively connected to the movable floor portion to provide for raising and lowering thereof.

8. The recreational vehicle as defined in claim 5, and the boat trailering portion having a plurality of cross members for cradling and supporting the boat and for providing structural reinforcement for the base frame for supporting the housing.

9. The recreational vehicle as defined in claim 8, and the cross members increasing in depth in a direction from the first end to the second end of the base frame for facilitating the launching of the boat.

10. The recreational vehicle as defined in claim 9, and the cross members having roller means attached thereto for facilitating the loading and launching of the boat.

11. The recreational vehicle as defined in claim 5, and further including winch means secured to the base frame for facilitating loading of the boat.

12. The recreational vehicle as defined in claim 11, and the winch means secured to a cross member of the base frame so that the winch means is held below the level of the movable floor section when the movable floor section is in the living area position.

13. The recreational vehicle as described in claim 5, and the movable floor portion including a pair of door portions each hingedly secured along and adjacent the common edges of the sidewalls and base frame thereof and swingable downwardly to a living area position and upwardly to a boat receiving position.

14. A recreational vehicle having a boat carrying and launching ability, comprising: An exterior housing having top and bottom surfaces, a pair of sidewalls, and back end and front end surfaces defining an interior living space thereof, and a base frame underlying the housing and providing support therefor, and the frame having a boat trailering portion integral therewith, the boat trailering portion having a first end and a second end, the second end terminating adjacent the back end surface of the housing, and the boat trailering portion having a plurality of cross members, and a movable floor portion, the movable floor portion extending horizontally and elevatable vertically between a top boat receiving position and a bottom living area position, and operating means connected to the movable floor portion for operating the floor portion to the boat receiving and living area positions, and a rear access door hingedly secured to the back housing surface for providing access into the interior living space of the housing so that the boat can be loaded there through onto the trailering portion and launched there through from the trailering portion.

15. The recreational vehicle as defined in claim 14, and the boat trailering portion having a plurality of cross members for cradling and supporting the boat and for providing structural reinforcement for the base frame for supporting the housing.

16. The recreational vehicle as defined in claim 15, and the cross members increasing in depth in a direction from the first end to the second end of the base frame for facilitating the launching of the boat.

17. The recreational vehicle as defined in claim 16, and the cross members having roller means attached thereto for facilitating the loading and launching of the boat.

18. The recreational vehicle as defined in claim 14, and further including winch means secured to the base frame for facilitating loading of the boat.

19. The recreational vehicle as defined in claim 18, and the winch means secured to a cross member of the base frame so that the winch means is held below the level of the movable floor section when the movable floor section is in the living area position.

* * * * *